US 6,671,723 B2

(12) United States Patent
Nguyen et al.

(10) Patent No.: US 6,671,723 B2
(45) Date of Patent: Dec. 30, 2003

(54) METHOD AND APPARATUS FOR SCANNING A WEB SITE IN A DISTRIBUTED DATA PROCESSING SYSTEM FOR PROBLEM DETERMINATION

(75) Inventors: Andrew Quoc Anh Nguyen, Austin, TX (US); John Joseph Edward Turek, South Nyack, NY (US); Menachem Shtalhaim, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/145,445

(22) Filed: May 14, 2002

(65) Prior Publication Data

US 2002/0178217 A1 Nov. 28, 2002

Related U.S. Application Data

(62) Division of application No. 09/315,611, filed on May 20, 1999.

(51) Int. Cl.[7] .............................................. G06F 15/173
(52) U.S. Cl. ...................................... 709/224; 370/242
(58) Field of Search ................................. 709/224, 223, 709/226, 201, 202, 203, 214, 200; 707/3; 370/242

(56) References Cited

U.S. PATENT DOCUMENTS

| 5,293,429 A | 3/1994 | Pizano et al. ................. 382/24 |
| 5,459,837 A | 10/1995 | Caccavale ............... 395/184.01 |
| 5,461,609 A | 10/1995 | Pepper ......................... 370/16 |
| 5,528,516 A | 6/1996 | Yemini et al. .......... 364/551.01 |
| 5,592,620 A | 1/1997 | Chen et al. ............. 395/200.01 |
| 5,600,797 A | 2/1997 | Marshall ................ 395/200.11 |
| 5,619,656 A | 4/1997 | Graf ....................... 395/200.11 |
| 5,796,633 A | * 8/1998 | Burgess et al. ............. 702/187 |
| 5,822,519 A | 10/1998 | Watanabe ................ 395/200.5 |
| 5,842,010 A | 11/1998 | Jain et al. .................... 395/675 |

(List continued on next page.)

OTHER PUBLICATIONS

Mockapetris, "Domain Names—Implementation And Specification", rfc 1035, Nov. 1997, pp. 1–47.
Malan et al., "An Extensible Probe Architecture for Network Protocol Performance Measurement", ACM, 1998, pp. 215–227.
Dasgupta et al., "A Probe–Based Monitoring Scheme for an Object–Oriented, Distribute Operating System", ACM, 1986, pp. 57–66.
Davies et al., "A Distributed Systems Platform for Mobile Computing", Mobile Network and Applications 3, 1998, pp. 143–156.
Kaloski, "Applying the RMON Standard to Switched Environments", Network Management 7, 1997, pp. 305–315.
Intrusion Detection, Market Survey, www.scmagazine.com, Jun. 1999, 20 pages.
ETEST Suite, Emprix, copyright 2001, 4 pages.
Urano et al., U.S. patent application Publication No. US 2001/0042119A1, Pub. Date Nov. 15, 2001, "Method for Monitoring Abnormal Behavior in a Computer System", Filed Jul. 25, 2001.

Primary Examiner—Bunjob Jaroenchonwanit
(74) Attorney, Agent, or Firm—Duke W. Yee; Jeffrey S. LaBaw; Cathrine K. Kinslow

(57) ABSTRACT

A method and apparatus for identifying problems associated with a web site. A scan of a web site is initiated by a plurality of agents, wherein each of the plurality of agents are at a different location in the distributed data processing system. Results of the scan are obtained from the plurality of agents. The results of the scan are analyzed to determine if a problem is associated with the web site.

5 Claims, 4 Drawing Sheets

U.S. PATENT DOCUMENTS

| | | | |
|---|---|---|---|
| 5,870,559 A | 2/1999 | Leshem et al. | 395/200.54 |
| 5,951,642 A | 9/1999 | Onoe et al. | 709/224 |
| 6,041,352 A * | 3/2000 | Burdick et al. | 709/224 |
| 6,115,680 A | 9/2000 | Coffee et al. | 702/187 |
| 6,138,155 A | 10/2000 | Davis et al. | 709/224 |
| 6,138,157 A | 10/2000 | Welter et al. | 709/224 |
| 6,167,398 A | 12/2000 | Wyard et al. | 707/5 |
| 6,223,306 B1 * | 4/2001 | Silva et al. | 714/37 |
| 6,237,006 B1 | 5/2001 | Weinberg et al. | 707/103 |
| 6,266,060 B1 | 7/2001 | Roth | 345/356 |
| 6,317,786 B1 | 11/2001 | Yamane et al. | 709/224 |
| 6,338,066 B1 | 1/2002 | Martin et al. | 707/10 |
| 6,359,633 B1 | 3/2002 | Balasubramaniam et al. | 345/760 |
| 6,405,327 B1 * | 6/2002 | Sipple et al. | 714/39 |
| 6,418,470 B2 | 7/2002 | Blumenau | 709/224 |
| 6,426,947 B1 * | 7/2002 | Banker et al. | 370/254 |
| 6,463,455 B1 * | 10/2002 | Turner et al. | 709/200 |
| 6,530,022 B1 * | 3/2003 | Blair et al. | 713/186 |
| 6,560,648 B1 | 5/2003 | Dunn et al. | 709/224 |
| 2002/0050926 A1 * | 5/2002 | Lewis et al. | 340/506 |

* cited by examiner

METHOD AND APPARATUS FOR SCANNING A WEB SITE IN A DISTRIBUTED DATA PROCESSING SYSTEM FOR PROBLEM DETERMINATION

This application is a divisional of application Ser. No. 09/315,611, filed May 20, 1999, status pending.

BACKGROUND OF THE INVENTION

1. Technical Field

The present invention relates generally to an improved distributed data processing system and in particular to a method and apparatus for identifying problems within a distributed data processing system. Still more particularly, the present invention provides a method and apparatus for scanning computers within a distributed data processing system for problem determination.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser that browses web sites. A web site is a group of related HTML documents and associated files, scripts, and databases that is served up by an HTTP server on the World Wide Web. The HTML documents in a web site generally cover one or more related topics and are interconnected through hyperlinks. Most web sites have a home page as their starting point, which frequently functions as a table of contents for the site. Many large organizations, such as corporations, will have one or more HTTP servers dedicated to a single web site. However, an HTTP server can also serve several small web sites, such as those owned by individuals.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java™ is an object oriented programming language and environment focusing on defining data as objects and the methods that may be applied to those objects. Java provides a mechanism to distribute software and extends the capabilities of a web browser because programmers can write an applet once and the applet can be run on any Java enabled machine on the Web.

With these features on the Internet and especially on the Web, E-commerce activities are becoming more and more important to various companies. Extended enterprises are becoming more common in which an extended enterprise is made up of customers, suppliers, distributors, and other business partners with whom a company conducts online business. With this increased e-commerce activity on distributed data processing systems, such as the Internet, it is important to ensure that web resources are available and to enable applications and information be distributed and maintained across the extended enterprise.

Companies control the resources, systems, networks, and applications within their own enterprises. Business practices, however, have changed. Enterprises are increasing becoming extended enterprises. The advent of the Internet has enabled companies to open their e-commerce "doors" to allow customer, suppliers, and distributors to share critical information online, in order to more efficiently conduct business with a wider range of partners. As a consequence, conducting business on the Internet means that companies must rely on a myriad of relationships with not only their trading partners, but also upon multiple Internet service providers (ISP) to conduct business transactions. It is important to identify problems with particular servers or web sites located on servers to ensure that e-commerce activities can be conducted without failure or without delays.

Therefore, it would advantageous to have an improved method and apparatus for identifying problems on servers and web sites in a distributed data processing system.

SUMMARY OF THE INVENTION

A method and apparatus for identifying problems associated with a web site. A scan of a web site is initiated by a plurality of agents, wherein each of the plurality of agents are at a different location in the distributed data processing system. Results of the scan are obtained from the plurality of agents. The results of the scan are analyzed to determine if a problem is associated with the web site.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a method, apparatus, and instructions for conducting a scan of a server or web site from at least two different locations so that the results can be correlated and the network impacts on the scan can be taken into account. When a problem is detected on one scan but not on the other scan, heuristics may be employed to determine whether the problem is a network effect or a real problem. When scans are performed from a fair number of locations, a majority rules policy may be implemented in making determinations and coming to conclusions. Alternatively, a discrepancy in scan results may indicate that a second more thorough scan should be initiated or that scans from other specific network locations would be helpful in problem determination. Additionally, multiple scans over time may be used to create a historical database to identify intermittent problems, originating from one or more network locations.

Figure 1:
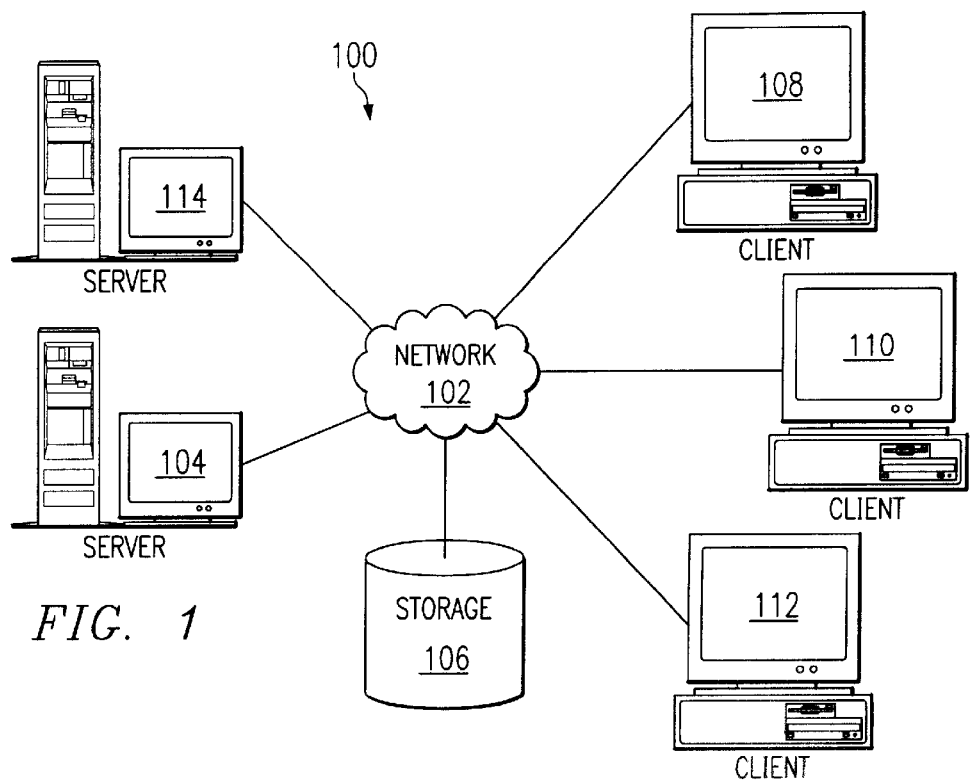
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Server 104 may be a server or computer that is used to initiate scans of a target resource using clients 108, 110, and 112. These clients are also referred to as "agents" when used to initiate scans of a target resource. In this example, server 114 also is connected to network 102 and may be a target resource that is scanned by clients 108, 110, and 112 acting as agents. Server 114 as illustrated is a web server, also referred to as a HTTP server, is a server software that uses HTTP to serve up HTML documents and any associated files and scripts when requested by a client, such as a web browser. The connection between client and server is usually broken after the requested document or file has been served. HTTP servers are used on Web and Intranet sites. A target resource that is scanned by agents may include other resources in addition to a web server. For example, without limitation, a target resource may be a web site, a file transfer protocol (FTP) site, or a domain name system (DNS) server. The results from these scans may be returned to server 104 for analysis or alternatively to another server or other computer. In other words, the computer initiating the scan is not necessarily the computer that will perform the analysis of the results returned by the agents.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
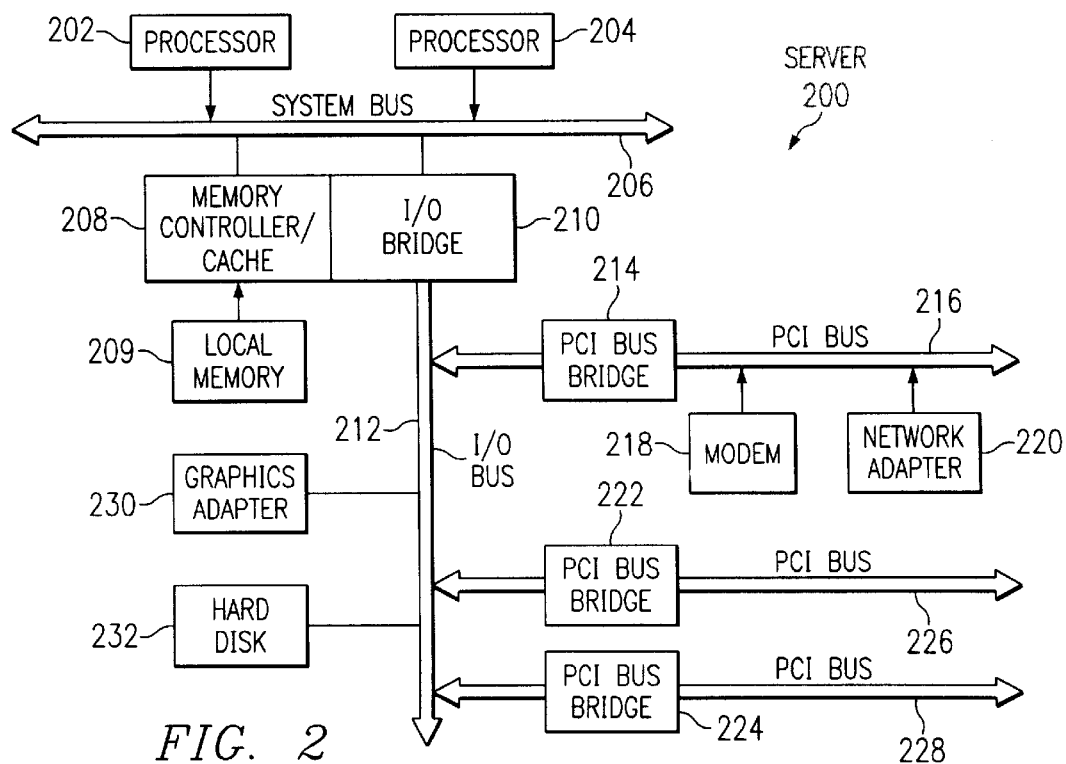
FIG. 2 is a block diagram depicting a data processing system, which may be implemented as a server, in accordance with a preferred embodiment of the present invention.

Referring to FIG. 2, a block diagram depicts a data processing system, which may be implemented as a server, such as server 104 in FIG. 1, in accordance with a preferred embodiment of the present invention. This data processing system is an example of a computer that may be used to initiate scans of a resource by two or more agents and to analyze results returned by the agents scanning the resource. More specifically, data processing system 200 is used to collect and analyze data collected from scans of selected resources, such as web sites, by two or more agents at different locations in the network. Server 104 is able to identify problems associated with resources by analyzing the data from the scans. For example, broken links, slow links, slow response times, and authorization failures are examples of problems that may be identified through scans. Although in this example, the computer used to initiate the scan and analyze the results is a server, other types of data processing systems also may be used to initiate and/or analyze results.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
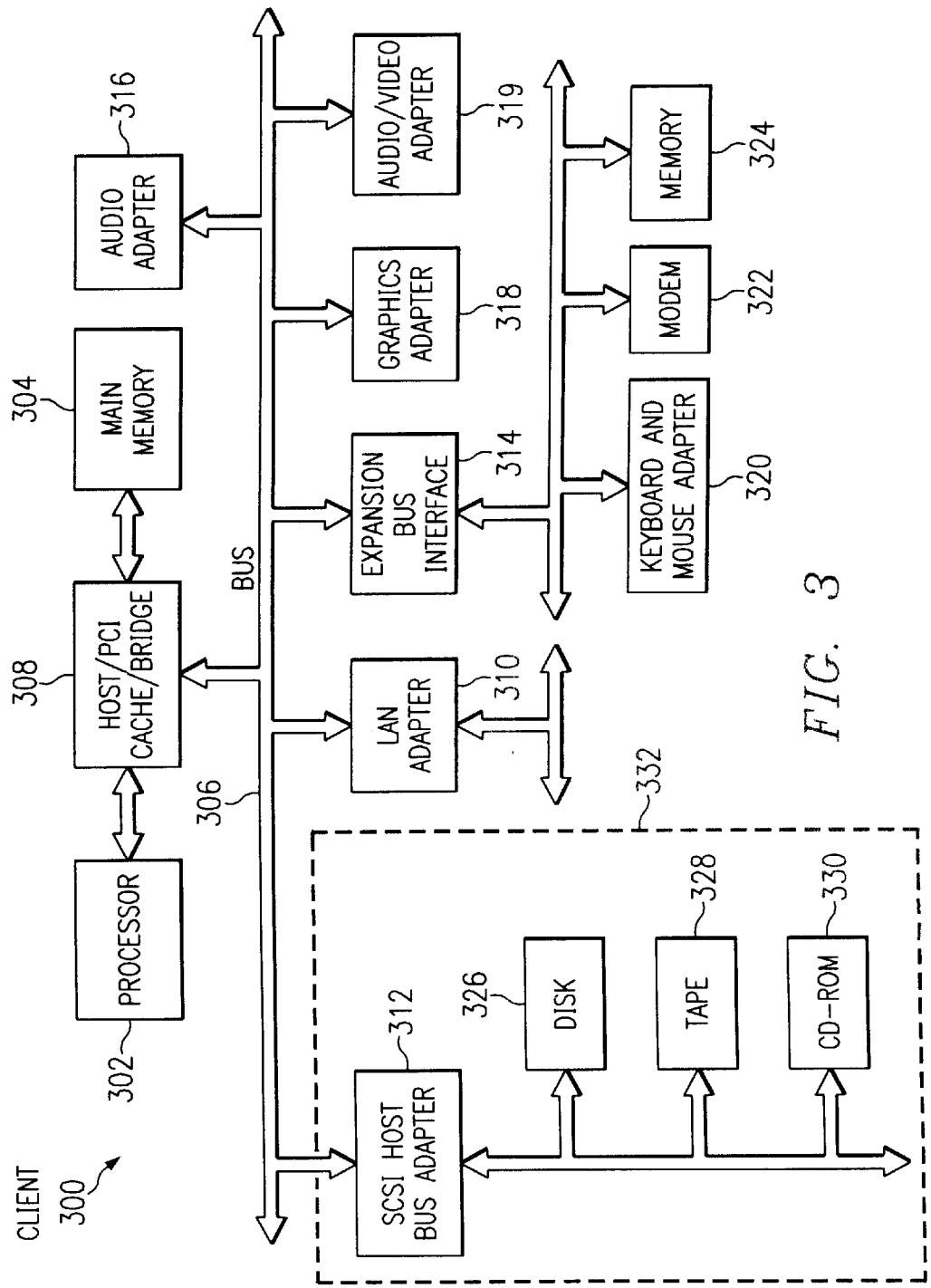
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer, which may be used as an agent to perform scans on a target resource. In this example, data processing system 300 may be used to scan a target resource by performing various tests or sending various requests to the target resource. For example, data processing system 300 may be used to access a web site, traverse various links located within the web site, and retrieve documents or other resources from the web site. The data and statistics gathered from a scan are returned to a server or other computer for analysis.

Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

Figure 4:
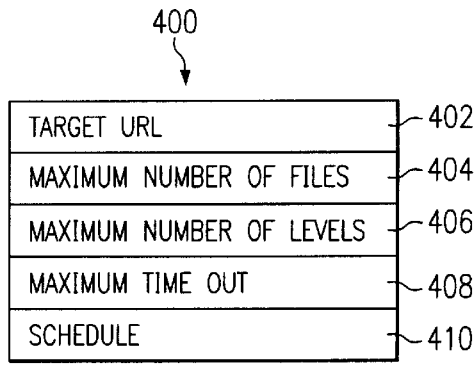
FIG. 4 is an illustration of a scan policy in accordance with a preferred embodiment of the present invention.

With reference now to FIG. 4, an illustration of a scan policy is depicted in accordance with a preferred embodiment of the present invention. Scan policy 400 is a data structure sent to an agent to initiate a scan of a resource. Scan policy 400 identifies the type of scan that an agent is to make. For example, scan policy 400 includes target field 402 in which scan policy 400 contains a URL of the target that is to be scanned. A maximum number of files field 404, which identifies how may files should be retrieved from the resource. These files may be for example, web pages, programs, video files, and audio files. Maximum number of levels field 406 identifies the maximum number of levels in the web site to scan. More specifically, this field identifies the number of levels within a web site that should be accessed by an agent.

Additionally, a maximum timeout may be set in scan policy 400 through max time out field 408 to terminate the scan if too much time is being taken. This is especially useful in the instance in which a file or level does not result in a response. In addition, scheduling information also may be present within the scan policy. The information may be specified in schedule field 410 to indicate that a scan should occur at a set time. The time may be immediately, periodically, or at a number of times pre-set within this field. In addition, start dates may be identified within the scan policy. Further, the server to whom the scan result is to be returned also may be placed within the scan policy. Of course, scan policy 400 may include other fields in addition to or in place of those illustrated. For example, a return field identifying the computer to which the results should be returned may be specified in scan policy 400. This field may be for example, a DNS name or an IP address.

Figure 5:
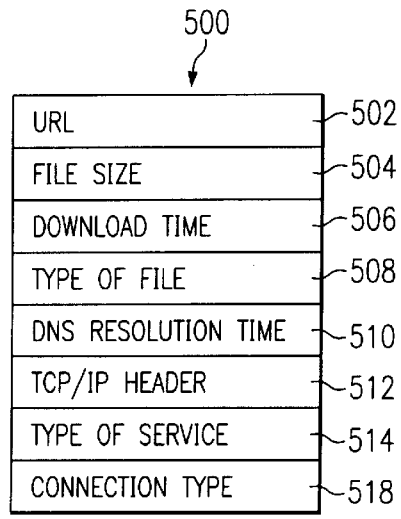
FIG. 5 is a diagram illustrating a data structure returning results from a scan, one per URL, in accordance with a preferred embodiment of the present invention.

Turning next to FIG. 5, a diagram illustrating a data structure returning results from a scan is depicted in accordance with a preferred embodiment of the present invention. Results 500 is a data structure, which is returned by an agent for analysis. Results 500 includes a URL field 502, which contains the URL scanned by the agent. In addition, a file size field 504 is used to indicate the size of the file retrieved from the URL. Download time field 506 is used to identify the amount of time needed to download the file. Type of file field 508 is used to identify the file type, such as whether the file is an executable file, a text file, a graphics file, or an audio file.

Results 500 also includes a DNS resolution time field 510, which identifies the amount of time taken to resolve the DNS name when the agent accessed the web site. TCP/IP header field 512 identifies the TCP/IP header. Some information is extracted from the TCP and IP headers of each response from the server, and is saved in TCP/IP header field 512. The IP header information saved includes: the time-to-live (TTL) value; the source IP address; and the destination IP address. The TCP header information saved includes: the source port number; and the destination port number. Type of service field 514 indicates the TCP/IP based service. It contains the TCP/IP port number of service. Connection type field 518 provides information as to the connection used by the agent to scan the web site. For example, this field may include the type of connection along with the speed of the connection (e.g., Ethernet, 64 k).

The illustrated fields in results 500 are not intended as limitations as to the type of information that may be returned by an agent for analysis. For example, other information, such as network round trip time, HTTP errors, DNS errors, and modem failures may be recorded by an agent and returned in results 500.

Figure 6:
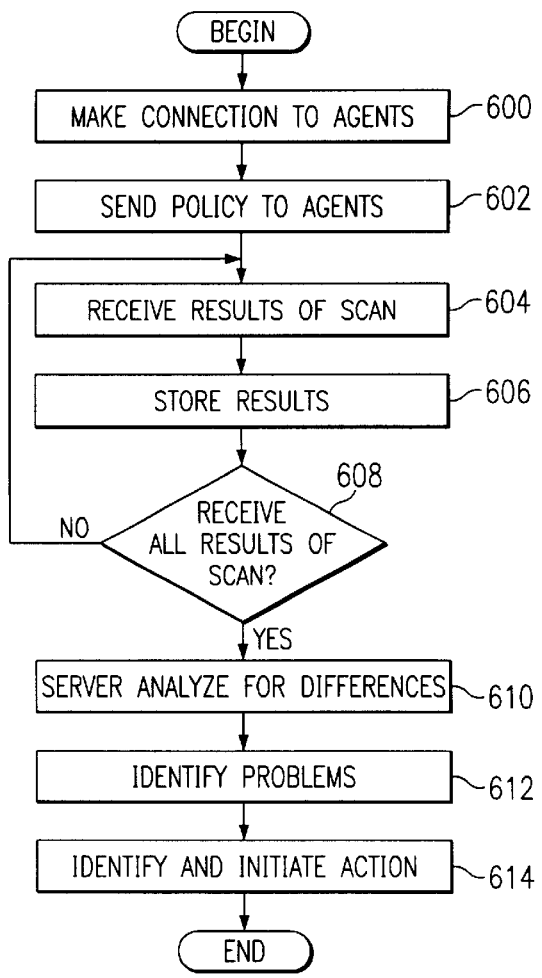
FIG. 6 is a flowchart of a process used by a server to initiate a scan of a web site or other target server in accordance with a preferred embodiment of the present invention.

With reference now to FIG. 6, a flowchart of a process used by a server to initiate a scan of web site or other target server is depicted in accordance with a preferred embodiment of the present invention. The process begins by making a connection to the selected agent (step 600). In this step, the server establishes a communications link with agent computers that are to initiate scans. These connections may be made using TCP/IP, but could be through any communications protocol. After making connection to the selected agent computers, then a scan policy, such as scan policy 400 in FIG. 4, is sent to the agent (step 602). In accordance with a preferred embodiment of the present invention, the scan may be made from agents from as many different locations as possible. The number of agents that are sent a scan policy are at least two and may be more depending on the number of available agents and on the type of data to be returned from the scan.

Thereafter, results from a scan are received (step 604), and the results are stored (step 606). A determination is then made as to whether all of the results from scans made by the agents have been received (step 608). If all of the results have not been received, the process returns to step 604. Thereafter, the results are analyzed to identify differences between the various scans (step 610). Then, problems, if any, are identified (step 612). An action is then identified and initiated (step 614) with the process terminating thereafter. This action may take a number of different forms from providing an error message to an administrator initiating a corrective action. In addition, the action taken may be to send a policy to one or more agents to perform a scan to collect additional or different information from the resource identified as having a problem. This additional information may be used to further identify the problem or to identify corrective action needed to resolve the problem.

Figure 7:
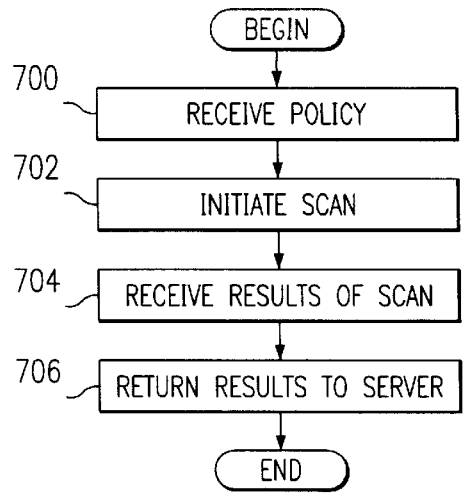
FIG. 7 is a high-level flowchart of a process employed by an agent to scan a target web site for a server in accordance with a preferred embodiment of the present invention.

With reference now to FIG. 7, a high-level flowchart of a process employed by an agent to scan a target web site for a server is depicted in accordance with a preferred embodiment of the present invention. The process begins by receiving a policy from a server (step 700). This policy is received when a scan is to be initiated. In response to receiving the policy, a scan is initiated by the agent on a selected resource, such as, for example, a web site (step 702). This scan includes, for example, accessing the resource, requesting data from the resource, and collecting data on the response made by the resource. This scan will take place using the protocol used by the resource. Thereafter, the results of the scan are received by the agent (step 704). The received results are then returned to the server (step 706) with the process terminating thereafter. Of course, depending on the implementation, the server sending the policy to the agent may be a different server from the server that is to receive and analyze the results.

The problems that may be identified by a server using the process illustrated in FIG. 4 analyzing data returned by an agent using the process illustrated in FIG. 5 include problems with the communications link, problems associated with heavy traffic, and problems with a domain name system (DNS) server, which is a computer that answers domain name service queries.

In addition, problems may occur in firewalls. Other area for problems include permissions, authorizations, and access control rights on a server. In addition, various server configurations or machine configurations may cause problems on a web site.

Figure 8:
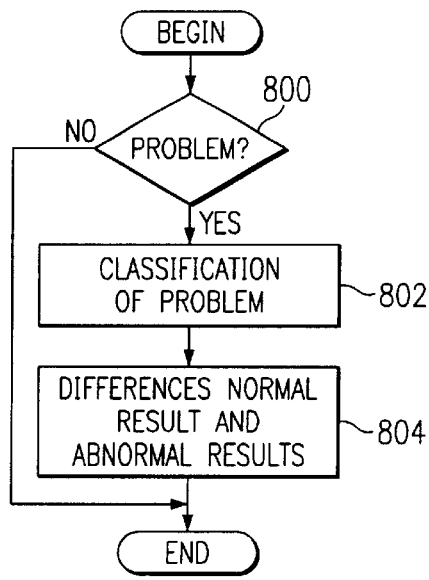
FIG. 8 is a flowchart of a process for analyzing problems on web sites in accordance with a preferred embodiment of the present invention.

With reference now to FIG. 8, a flowchart of a process for analyzing problems on web sites is depicted in accordance with a preferred embodiment of the present invention. The process begins by determining whether a problem is present (step 800). This determination may be made by identifying whether variations are present between results from the scan made by the agents. In particular, a determination is made as to whether the results are statistically significant. If a problem is present, then the problem is classified (step 802). The classification of the problem includes analyzing the results with thresholds and using statistical analysis. Thereafter, differences between normal results and abnormal results are identified (step 804). This step involves correlating the results of the scan made by different agents to identify common attributes. This step is used to address problem scans from different locations in which some scans may be okay while other scans are abnormal. The abnormal scans are compared to various scans for normal situations and abnormal situations to identify problems based on common attributes with different categories. With reference again to step 800, if a problem is not present, the process terminates.

Figure 9:
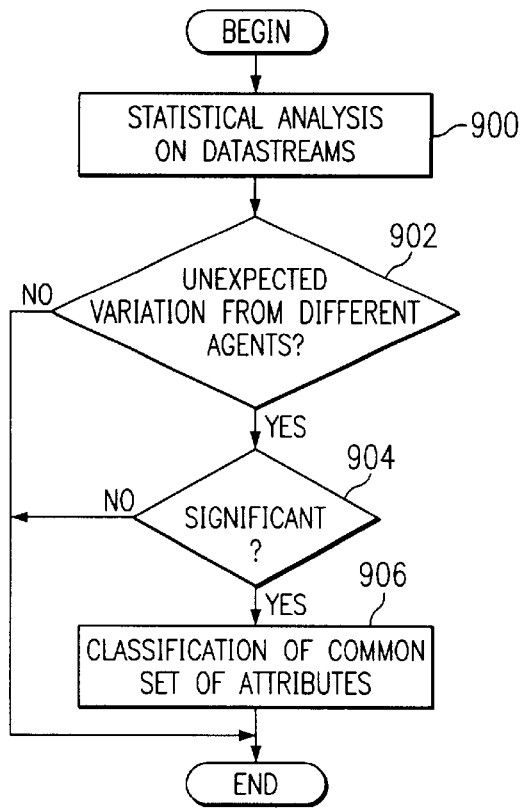
FIG. 9 is a flowchart of a process for statistical analysis of a data stream in accordance with a preferred embodiment of the present invention.

With reference now to FIG. 9, a flowchart of a process for statistical analysis of a data stream is depicted in accordance with a preferred embodiment of the present invention. The process begins by performing a statistical analysis on the data stream (step 900). Based on this statistical analysis, a determination is made as to whether an unexpected variation is present from different agents (step 902). This identification of whether a variation is unexpected may be made by comparing the variation with historical data. If an unexpected variation is present, then a determination is made as to whether the variation is significant (step 904). Over time, the amount of data gathered from scans of the same site from the same agent lends itself to statistical analysis, which can help in further determining problems. For example, heuristics can be applied in establishing variation thresholds from either the mean or the median of a type of data. Transactions with values for that data type, which fall outside of those thresholds, will then be considered anomalous, and will be further analyzed. This identification of whether a variation is significant is typically determined by using statistical analysis of the variation and comparing the variation with historical data. Alternatively, the variation may be compared to a threshold, which also may be based on historical data. A significant variation may include a broken link in which no communication or result is returned for a scan from an agent. Alternatively, a significant variation may occur if a download from one agent takes one half of a second while a download from another agent takes forty-five seconds.

Thereafter, a classification of the results is made using a common set of attributes that have been identified for different situations (step 906) with the process terminating thereafter. This classification uses attributes that have been identified for different problems, such as a failed link, heavy traffic, access rights failures, and server malfunctions. Based on what attributes are matched to the scans with significant or unexpected variations, the problem and possible correct action may be taken.

With reference again to step 904, if the variation is not significant, the process also terminates. The process again terminates if a variation from different agents is not present in step 902.

DNS resolution tables are an example of a target resource that may be scanned by agents located at different locations in a network. A DNS server keeps a database, e.g., a DNS resolution table, of host computers and the corresponding IP addresses. When presented with a name, such as IBM.Com, for example, the DNA server would return the IP address of the company. The DNA is a system by which hosts on the Internet have both domain name addresses and Internet Protocol (IP) addresses. The domain name address is used by human users and is automatically translated into a numerical IP address corresponding to the domain name address, which is used by the packet routing software.

From a single agent, the DNS resolution table may seem okay, but multiple scans from multiple agents located at different sites in a network may show a problem. A comparative analysis of the results from DNS resolutions from different agents will show whether the behavior of the scan behaves much differently from different locations. The variation in DNS resolutions may be very apparent with a broken link. Such a problem is immediately visible. If one agent has a problem, this may indicate a problem with a subnet. Multiple agents having problems may indicate problems of the following types: a common DNS server that is accessed by the agents has problems; the DNS server may be down or its network connection is broken; or the DNS server's host name-to-IP address table may not be up-to-date, or may contain errors, thus returning invalid IP addresses.

In another example, if all of the agents find some performance problem, the problem may be tied with the target server. If, however, the agents scanning a web site see different problems, congestion may be the cause of particular problems in part of the network.

Figure 10:
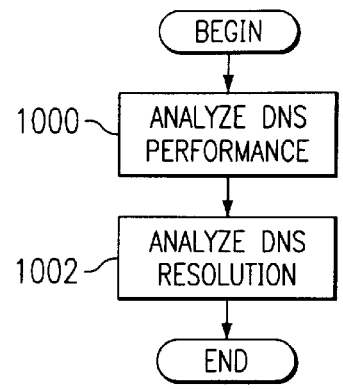
FIG. 10 is a flowchart of a process for analyzing DNS performance in accordance with a preferred embodiment of the present invention.

With reference now to FIG. 10, a flowchart of a process for analyzing DNS performance is depicted in accordance with a preferred embodiment of the present invention. This process is performed to identify results from DNS performance based on scans made by agents. The process begins by analyzing the DNS performance to determine whether a strange or abnormal DNS resolution was encountered by an agent (step 1000). Such an occurrence may indicate a problem with a subnet. A subnet is a portion of a network in which computers in the subnet show the same network attributes, such as, for example, the same prefix in an IP address. Essentially, a subnet is a group of machines that have access to the same network resources.

Thereafter, The DNS resolution is analyzed (step 1002). In analyzing the DNS resolution, a determination is made as to whether a resolution from a name to an IP address occurred. This determination may be made by identifying agents at different locations as to whether all of the locations returned a proper result. An improper DNS resolution at one site may indicate a problem with a subnet or particular geographic location. This kind of test may involve agents both in an Internet and an Extranet.

Figure 11:
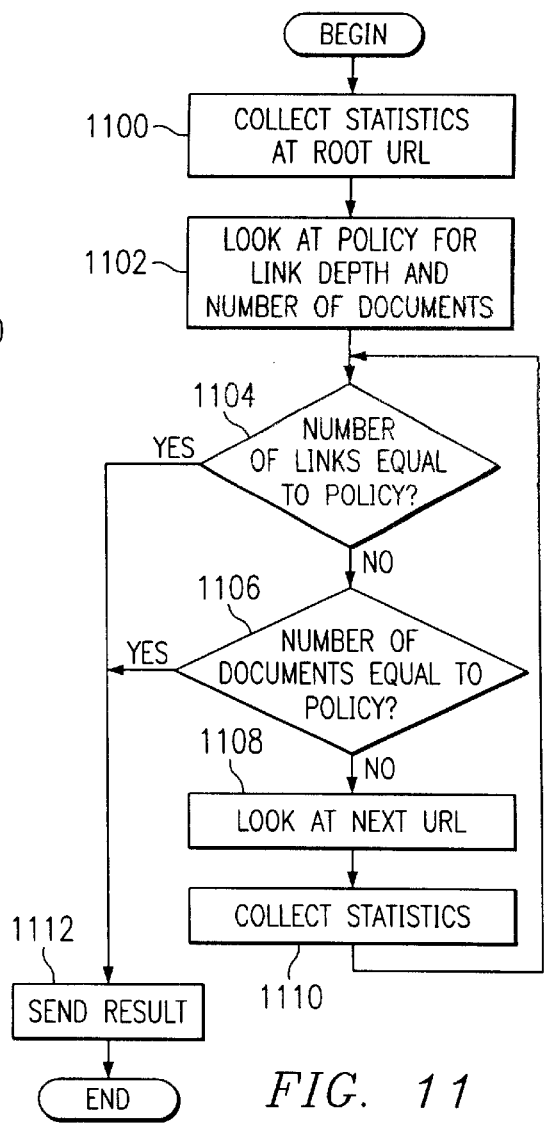
FIG. 11 is a flowchart of a process employed by an agent to scan a web site in accordance with a preferred embodiment of the present invention.

With reference now to FIG. 11, a flowchart of a process employed by an agent to scan a web site is depicted in accordance with a preferred embodiment of the present invention. This process is also referred to as a scanning process or a web crawling process. The scan begins by collecting statistics at the root universal resource locator (URL) (step 1100). The information obtained from a scan may include the URL, the size of the document at the URL, the download time for the document, DNS resolution time, TCP/IP header information, the type of document, the type of service, and the connection type. The type of document identified also may be as to whether the document is executable or a text or graphic document or a combination of the two. The connection type may include identification of whether the type of connection along with the speed. Next, the policy is examined for length, depth, and the number of documents to be retrieved (step 1102). A determination is then made as to whether the number of links is equal to that identified by the policy (step 1104). If the number of links is not equal to the number set by the policy, then a determination is made as to whether the number of documents to be retrieved equals that set by the policy (step 1106). If the number of documents has not been reached, then the next URL is identified (step 1108).

Thereafter, statistics is collected for the URL (step 1110) with the process then returning to step 1104. If the number of links is equal to that set by the policy in step 1104, or the number of documents retrieved is equal to that set by the policy in step 1106, then the process will send the result identified in the policy (step 1112) with the process terminating thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for scanning a computer system connected to a network, the method comprising:

performing a scanning process from a first network location and from a second network location, wherein a first set of scan results and a second set of scan results are generated;

comparing the first set of scan results with the second set of scan results for differences to detect network related problems; and performing a given action based on differences detected from comparing the first set of scan results with the second set of scan results, wherein differences detected from comparing the first set of scan results with the second set of scan results are compared to a set of heuristics linked to respective actions and a given heuristic is detected.

2. The method of claim 1, wherein the given action is performing a different type of scanning process from at least one of the first network location and the second network location.

3. A data processing system for scanning a computer system connected to a network, the data processing system comprising:

first performing means for performing a scanning process from a first network location and from a second network location, wherein a first set of scan results and a second set of scan results are generated;

comparing means for comparing the first set of scan results with the second set of scan results for differences to detect network related problems; and second performing means for performing a given action based on differences detected from comparing the first set of scan results with the second set of scan results, wherein differences detected from comparing the first set of scan results with the second set of scan results are compared to a set of heuristics linked to respective actions and a given heuristic is detected.

4. The data processing system of claim 3, wherein the given action is performing a different type of scanning process from at least one of the first network location and the second network location.

5. A computer program product in a computer readable medium for scanning a computer system connected to a network, the computer program product comprising:

first instructions for performing a scanning process from a first network location and from a second network location, wherein a first set of scan results and a second set of scan results are generated;

second instructions for comparing the first set of scan results with the second set of scan results for differences to detect network related problems; and third instructions for performing a given action based on differences detected from comparing the first set of scan results with the second set of scan results, wherein differences detected from comparing the first set of scan results with the second set of scan results are compared to a set of heuristics linked to respective actions and a given heuristic is detected.

* * * * *